Sheet 3. 3 Sheets
G. F. Palmer.
Waste Picker.
N° 99,699.    Patented Feb. 8, 1870.
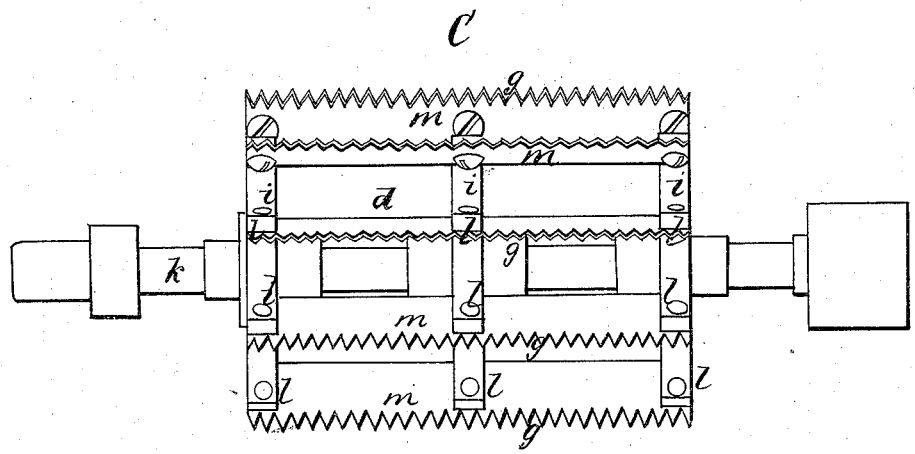
Witnesses,
S. B. Kidder
M. W. Frothingham
George F. Palmer  Inventor,
by his attys.
Crosby, Halstead & Gould

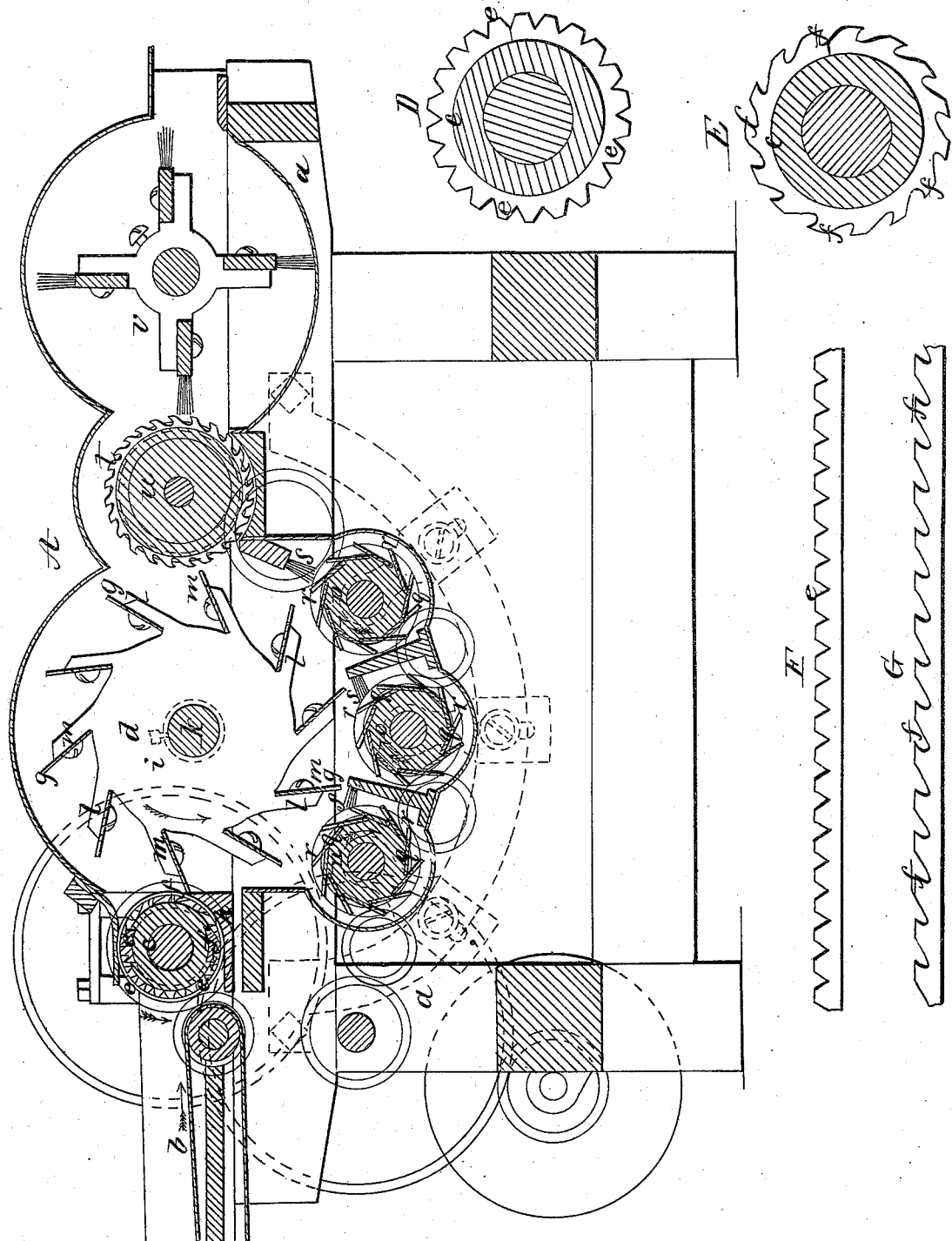

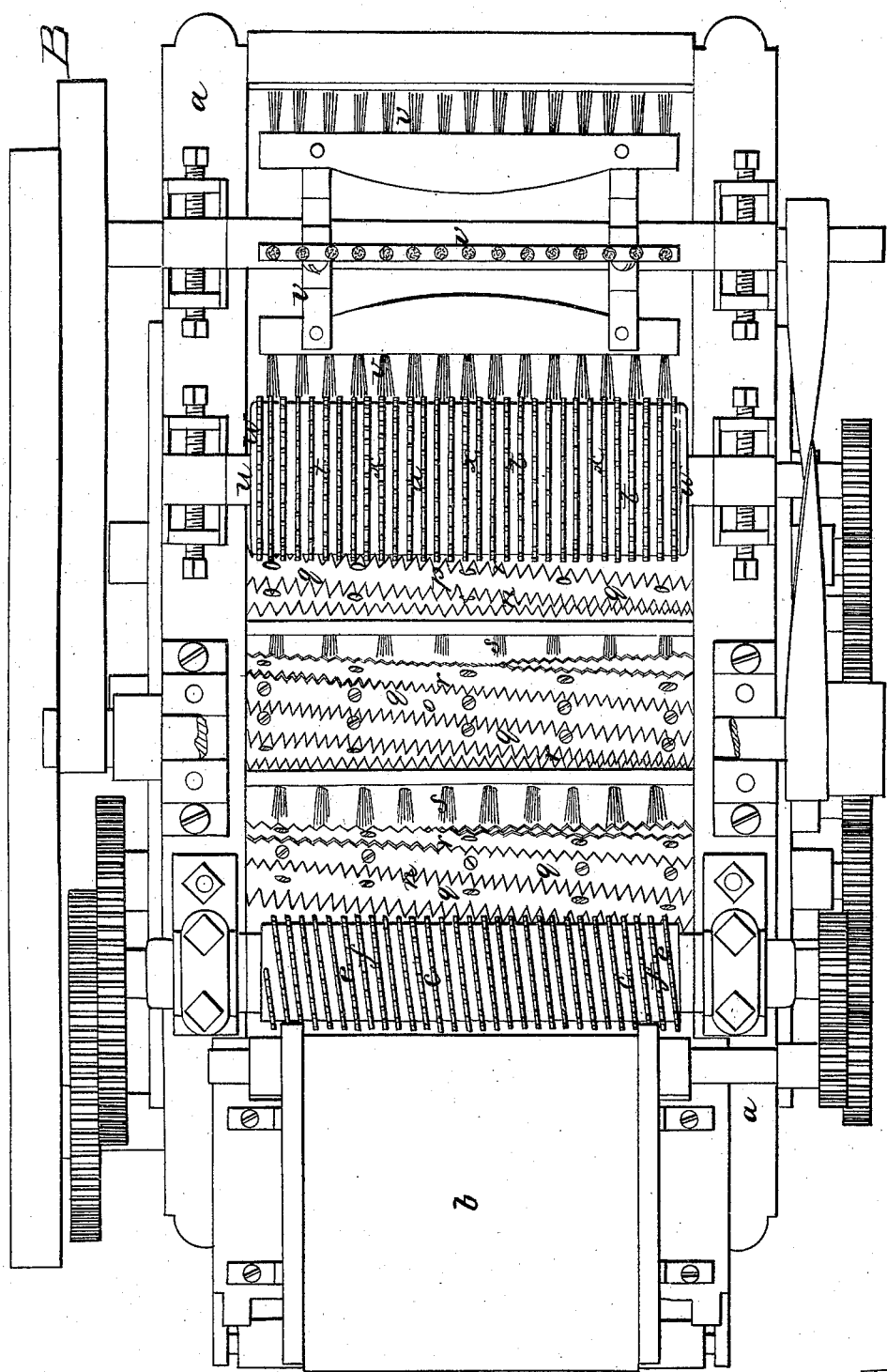

United States Patent Office.

GEORGE F. PALMER, OF ROCHESTER, NEW HAMPSHIRE.

*Letters Patent No. 99,699, dated February 8, 1870.*

IMPROVEMENT IN MACHINE FOR PICKING COTTON AND OTHER WASTE.

The Schedule referred to in these Letters Patent and making part of the same.

*To all whom it may concern:*

Be it known that I, GEORGE F. PALMER, of Rochester, in the county of Strafford, and State of New Hampshire, have invented an Improved Machine for Picking Waste; and I do hereby declare that the following, taken in connection with the drawings which accompany and form part of this specification, is a description of my invention sufficient to enable those skilled in the art to practise it.

My invention relates to the construction and organization of mechanism for picking cotton or other fibrous waste, rags, remnants, &c., to reconvert the same into fibre, to be carded and spun.

To produce a gradual separation of such material into its original fibres, or into loose assemblages of straight fibres, I employ a feed-cylinder, a main stripper or comb-cylinder, and a receiver cylinder of peculiar construction, as also certain auxiliary cylinders or workers of novel construction, and the several distinctive features constituting my invention will be clearly understood after I have described in detail the construction and arrangement of the mechanism, as shown in the accompanying drawings, which represent a machine embodying my improvements.

In these drawings—

A denotes a sectional elevation of the machine;

B, a plan of the machine, the main cylinder being removed;

C, a view of the main cylinder.

*a* denotes the main frame, having suitable bearings for supporting the shafts or journals of the respective rolls and cylinders.

At one end of the frame is a feed-apron, *b*, upon which is placed the "waste" to be picked, the apron conveying the material to the cylinder *c*, by which the material is fed to the action of the main comb or cylinder *d*.

The feed-cylinder *c* has two sets of teeth, *e* and *f*, the teeth *e* being simply feed-teeth, designed to carry the material from the apron *b* to the main cylinder, while the teeth *f* are designed as hold-backs to hook upon the waste and hold it between the feed-cylinder and throat-piece, against the pulling action of the teeth of the main comb-cylinder.

Each feed-tooth *e* is made as seen enlarged at D, and each tooth *f* has a hooking form, as seen at E, and as the waste is seized by the feed-teeth *e* it is carried between the cylinder and a throat-bar, *h*, until it emerges at the back of the cylinder, between it and the upper edge of the throat-plate *h*, seen at A, where it is seized by the teeth of the main cylinder, (rotating with great relative speed,) the fibres catching upon and being held back by the hooks *f* and the edge of the plate, and being drawn and pulled by the main comb teeth, which thus tend to loosen them and disunite the twisted, interlocked, or interwoven fibres.

The feed-cylinder, with its teeth *e f*, is constructed by cutting around the cylindrical surface of a plain cylinder two adjacent spiral grooves, and inserting in one of these grooves a long wire or ribbon, F, having one edge formed with teeth *e*, and in the other a long ribbon or wire, G, having one edge formed with teeth *f*.

The feed-cylinder rotates in the direction of the arrow, as seen at A, and the main comb-cylinder *d* in the same direction, and the points of the teeth of the main cylinder just clear the edge of the cross-plate *h* as they rotate.

The cylinder *d* is constructed with a series of heads, *i*, adjustably fixed on a shaft, *k*, so that they may be turned thereon, and secured in different relative positions, as desired, and from each of which heads project arms *l*.

To every set of arms (in line) a toothed plate, *m*, is fastened, the three arms being so arranged that the plate sets in a slightly spiral position, so that the teeth of each plate, from end to end, come against the edge of the plate *h* in succession, and thereby strip the waste from the feed-cylinder more perfectly than if the points of the teeth set parallel to the axis of the cylinder, the adjustment above named of the heads *i* allowing any required variation of this spiral position.

The edge of each card-plate *m* is serrated, to form the teeth *g*, and the arms *l* are placed at an angle to give the teeth a downward inclination at the point or line where they seize the waste from the feed-cylinder, any fibre caught by the teeth being thereby prevented from slipping off of them as they pass by the feed-cylinder and throat-plate *h*.

Beneath the main cylinder is a series of workers or worker-cylinders, *n o p*.

Each of these workers is composed of a series of plates, *q*, having on one edge serrated teeth, *r*, each set of teeth on each worker being preferably set on an angle or spirally, as seen at B, and the plate being so formed and fastened to the cylinder that the teeth project out from the surface at an angle, as seen at A.

The main comb-cylinder first delivers the waste (partially stripped) to the teeth of the worker *n*, (which worker rotates in the direction of the arrow thereon,) and thence to the workers *o* and *p* in succession. The material is kept directly between the main comb-teeth and the teeth *r* of the respective workers, the fibre being brushed from the teeth as they pass downward in their rotation by stationary brushes *s*, one to each worker; and the teeth of each worker, being inclined in opposite direction to the teeth of the main cylinder, operate as hooks to hold back the fibre, as the main teeth, at their greater speed, drag the material along over the respective workers the workers all carrying the material forward towards the receiver, but furnishing in effect so many stationary hooks, by which to regrasp the material, while the main card-teeth pick and comb it into long and loose parallel fibres.

As the fibre, after subjection to the successive operations between the main comb-cylinder and the feed-roll, and main card-teeth and first, second, and third workers, is further moved on by the main cylinder, it is carried against the receiver cylinder $u$, which rotates in opposite direction to the main cylinder.

This receiver is studded with hooks or teeth, which incline forward, or in the direction in which they rotate, and these hooks, catching upon the fibre on the main comb-teeth, strip off such fibre, which, adhering to the teeth, is carried around on the receiver cylinder, until it meets a rotary brush, $v$, by which it is removed and thrown from the machine in condition for carding.

The receiver cylinder $u$ is composed of a series of rings, $t$, with peripheral hook-forming notches, the rings being slipped upon a suitable roll, between heads $w$, a washer, $x$, being interposed between each two adjacent toothed rings. While the hooks are so inclined that they seize upon and retain the fibres as they pass the main card, the rotary brushes $v$ moving at greater speed, easily strip the fibre from the receiver, and throw it from the machine.

A carding-machine may be directly connected with the picker, taking the material from the receiver $u$.

By the peculiar construction and arrangement of the respective teeth of the main cylinder and the worker cylinders, the coarsest of waste may be cheaply and speedily reduced or converted into fibre ready for carding and spinning.

The formation of the teeth $g\ r$ as acute angled serrations on the edges of rigid metal plates, gives great strength and endurance to them, while the angles at which the teeth $e$, $f$, and $r$ are set relatively to each other and their respective paths and speeds of rotation cause them to rapidly tear and pull the waste into separate fibres, so that with a comparatively simple organization the work of picking is very perfectly performed.

Besides the strength obtained in the stripping-teeth by forming them as described, it will be obvious that they can be made at small cost, and can be easily replaced when worn.

In the construction of a working machine, the throat-plate $h$ is preferably made with provision for adjustment toward and from the main cylinder, and the bearings of the receiver-shaft and rotary brush-shaft are also made laterally adjustable, and the bearings of the worker cylinder $c$ adjustable radially to set the workers more or less distant from the main cylinder, these and other adjustments being made as circumstances may require.

I claim the main cylinder $d$, made with a series of serrated plates set at tangential angles, and secured to heads which are capable of adjustment around the shaft, substantially as shown and described.

Also, in combination with the main cylinder, serrated plates, set angularly to the axis as well as at lateral angles, substantially as described.

Also, in combination with the main cylinder, the feed-roll, having the feed-teeth $e$ and the hooks $f$ arranged alternately, substantially as described.

Also, in combination with the main cylinder $d$, a worker or workers, provided with serrated peripheral plates, the teeth of which set at angles relatively to the main cylinder, substantially as shown and described.

Also, in combination with the workers $n\ o\ p$, the stationary brushes $s$.

Also, in combination with the main cylinder $d$, constructed as described, the receiver $u$, having hooking teeth formed on the peripheries of rings, substantially as shown and described.

Also, the combination, with the cylinder $c$, having the feed-teeth $e$, and the hooking-teeth $f$, of the throat-piece $h$, constructed and arranged as described.

GEORGE F. PALMER.

Witnesses:
JOHN H. FULLER,
SARAH PALMER.